Figure 10:
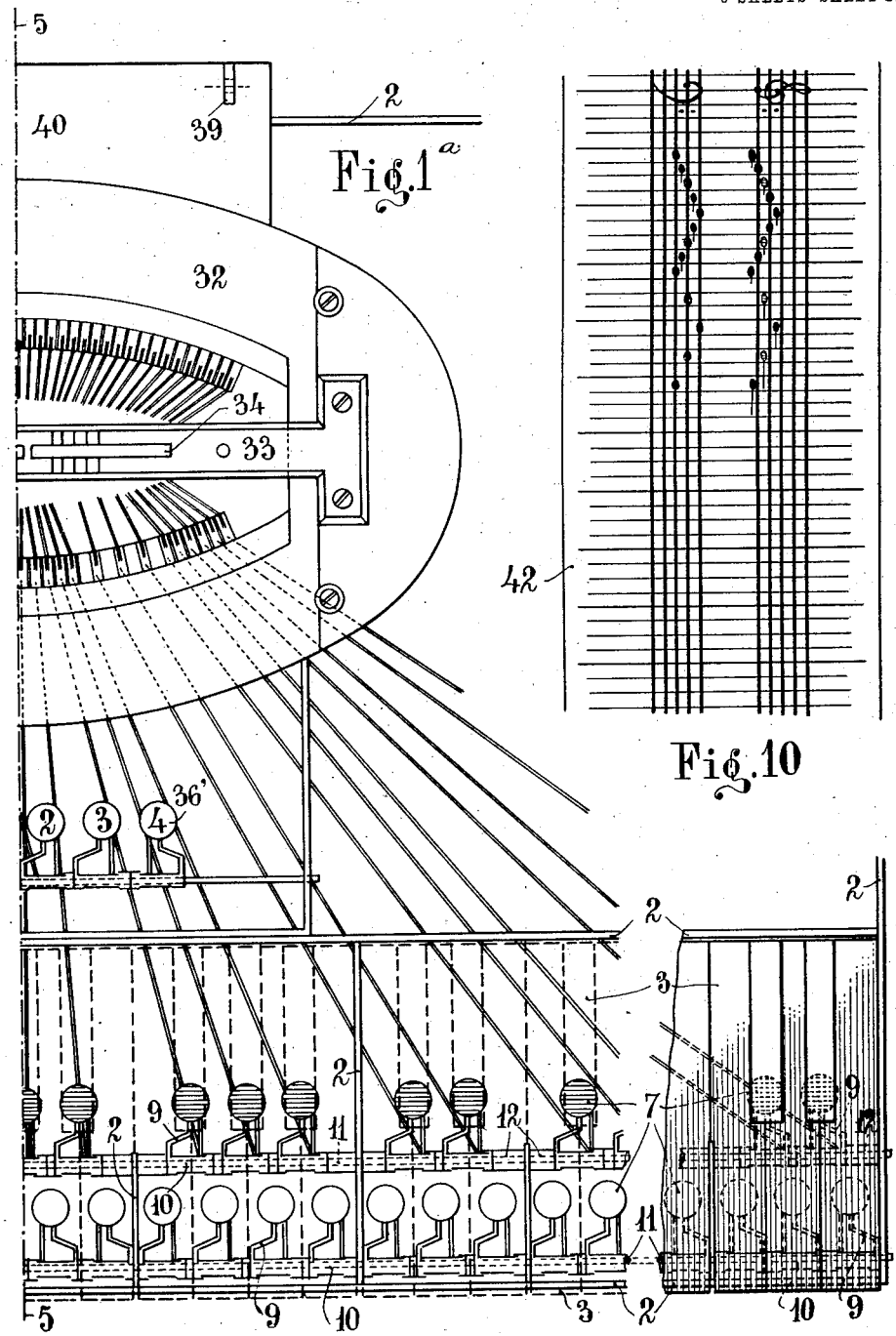

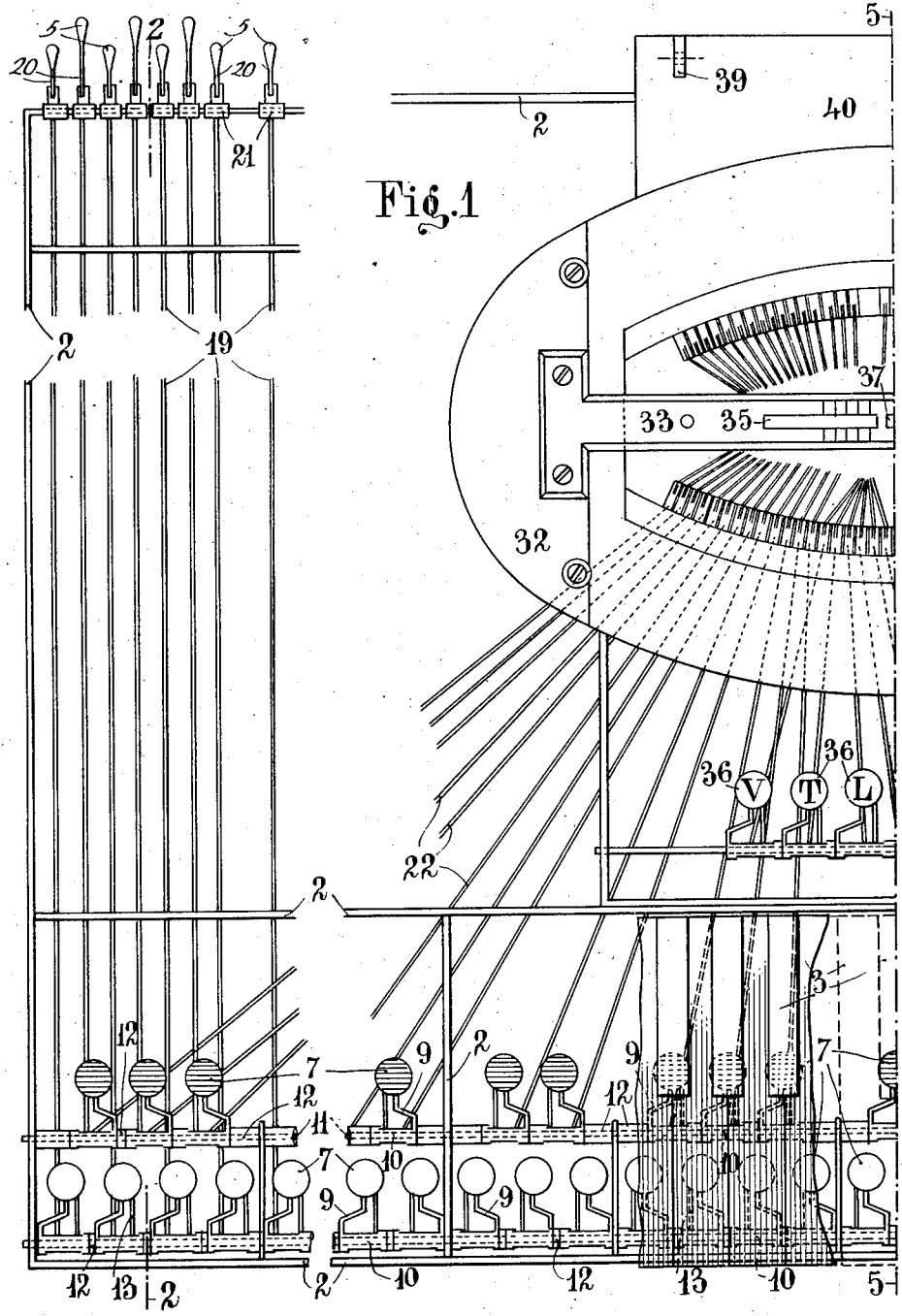

G. B. CIRIGLIANO.
MUSIC RECORDER.
APPLICATION FILED AUG. 23, 1910.

1,026,908.

Patented May 21, 1912.
6 SHEETS—SHEET 2.

Fig. 1ᵃ

Witnesses
B. Sommers
May Ellis

Inventor,
Giovanni Battista Cirigliano
By Henry Orth
atty

G. B. CIRIGLIANO.
MUSIC RECORDER.
APPLICATION FILED AUG. 23, 1910.
1,026,908.
Patented May 21, 1912.
6 SHEETS—SHEET 3.
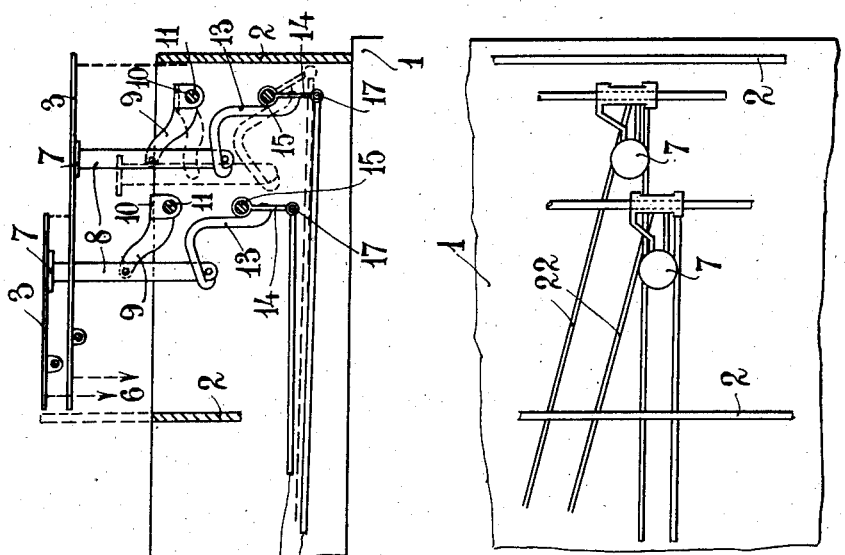
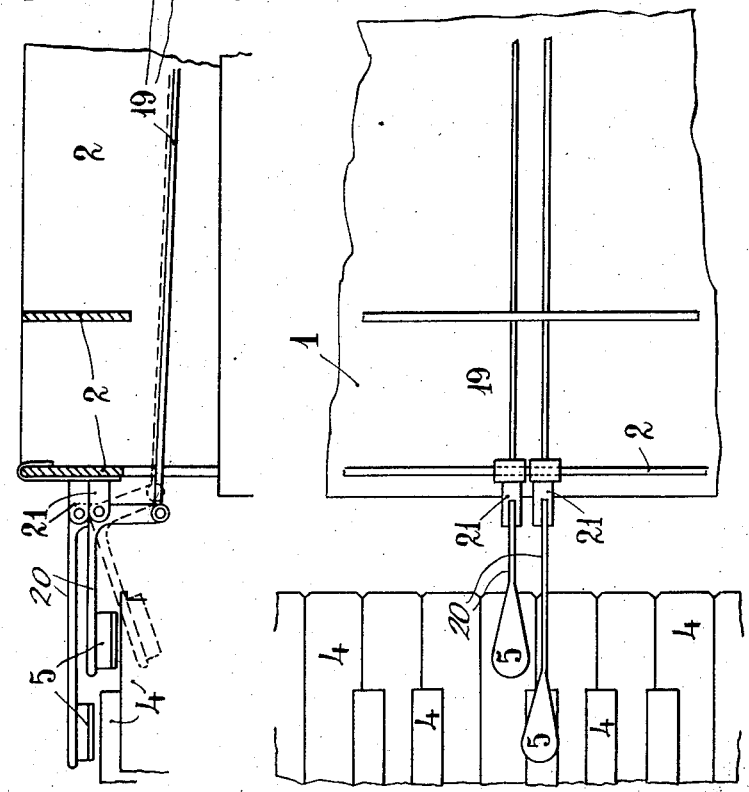
Witnesses
B. W. Dommers
May Ellis
Inventor,
Giovanni Battista Cirigliano,
By Henry Orth
Atty.

G. B. CIRIGLIANO.
MUSIC RECORDER.
APPLICATION FILED AUG. 23, 1910.
1,026,908.
Patented May 21, 1912.
6 SHEETS—SHEET 4.
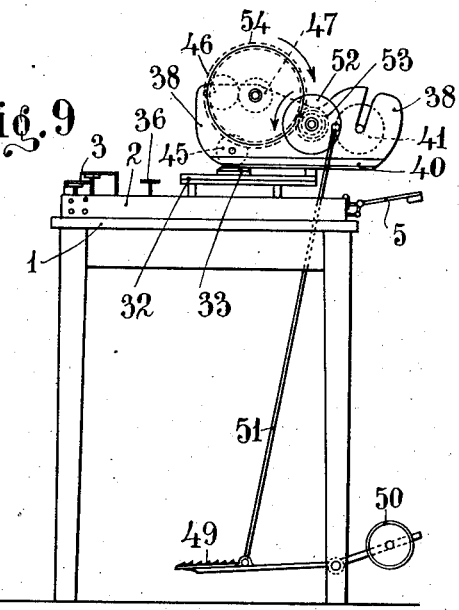
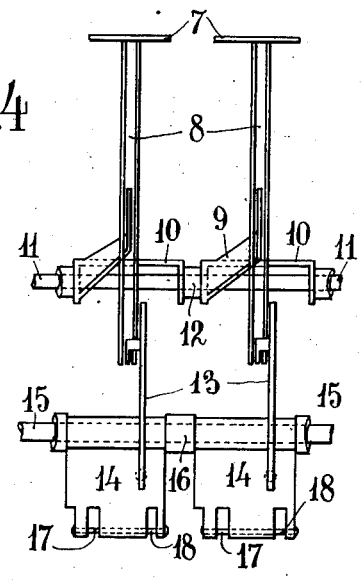
Witnesses
Inventor
Giovanni Battista Cirigliano

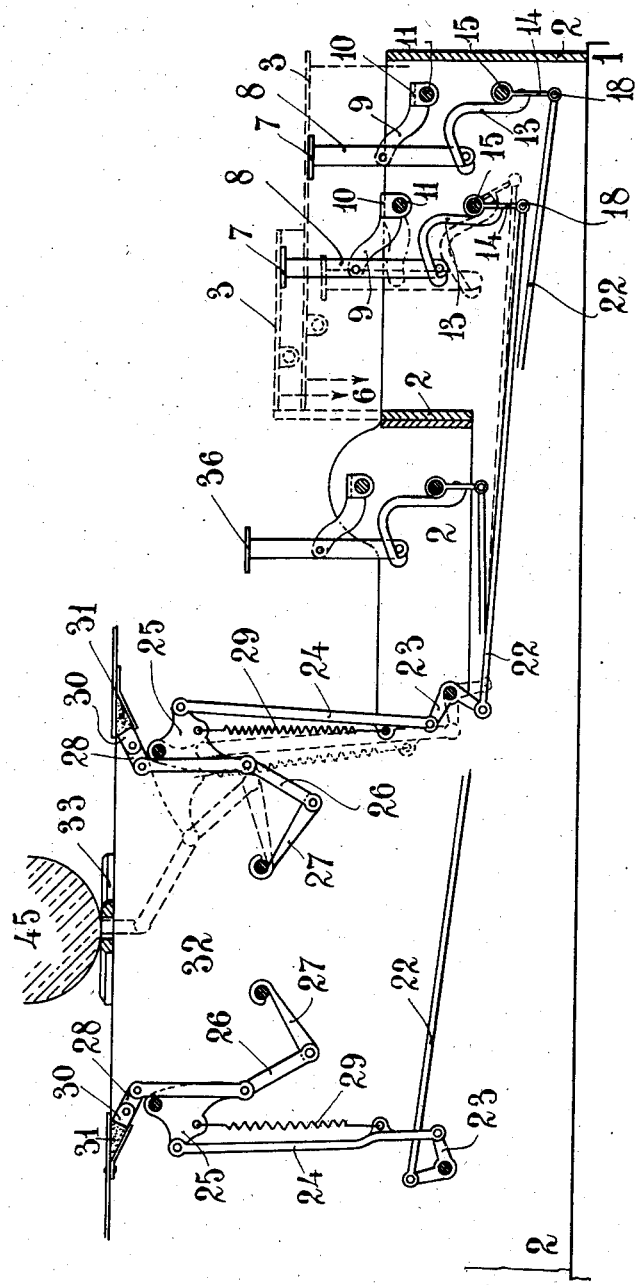

G. B. CIRIGLIANO.
MUSIC RECORDER.
APPLICATION FILED AUG. 23, 1910.
1,026,908.
Patented May 21, 1912.
6 SHEETS—SHEET 6.
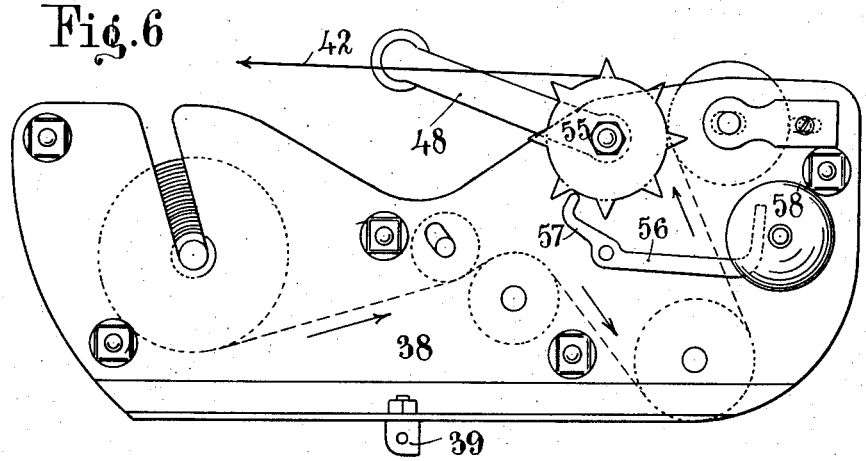
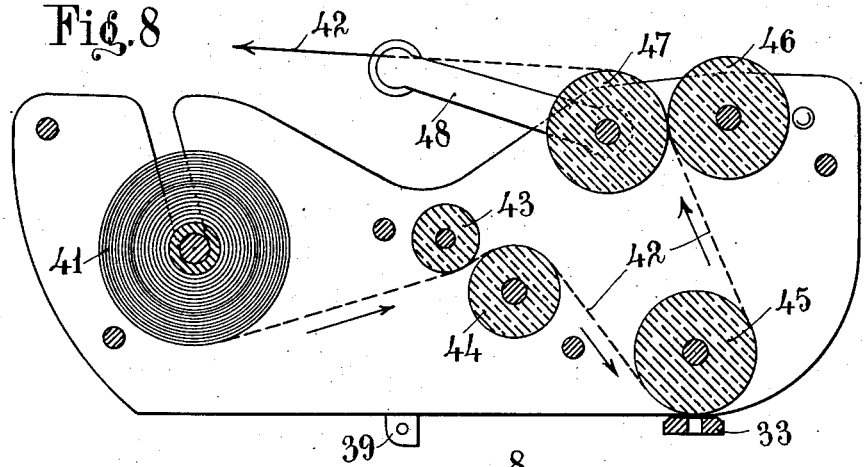
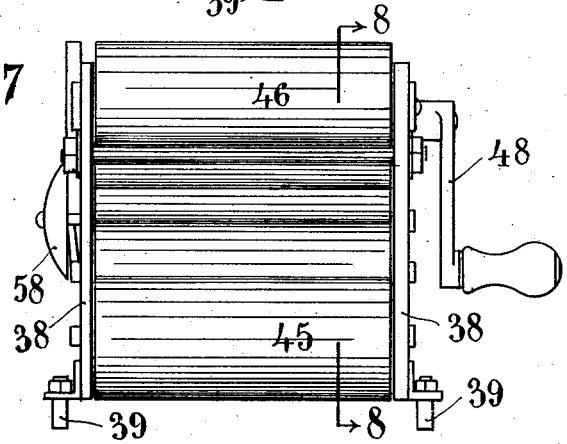

UNITED STATES PATENT OFFICE.

GIOVANNI BATTISTA CIRIGLIANO, OF TURIN, ITALY.

MUSIC-RECORDER.

1,026,908.

Specification of Letters Patent.　　Patented May 21, 1912.

Application filed August 23, 1910. Serial No. 578,598.

*To all whom it may concern:*

Be it known that I, GIOVANNI BATTISTA CIRIGLIANO, a subject of the King of Italy, residing at 7 Via Carlo Promis, Turin, Italy, music-master, have invented certain new and useful Improvements in Music-Recorders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is recognized that it would be very desirable for a musical composer to be able to record graphically, the musical phrases composed in playing the pianoforte, by the very act of playing. It frequently happens, however, that the musician is unable to record the motive discovered and he frequently has with regret to abandon it and substitute another, which may be far less pleasing.

The present invention has for its object to obviate this defect and relates to a machine by means of which simultaneously with their instrumental execution, the musical phrases are recorded in suitable characters printed on a strip of paper fed forward uniformly and in correspondence with the tempo of the composition. It will be understood that this result is attained by means of a special kind of musical notation, hereinafter explained, differing from the ordinary method of indicating musical notes heretofore employed, but nevertheless adapted to be readily read and interpreted and if desired transposed into the ordinary musical notation.

The machine is constituted by a duplicate apparatus one part of which serves to sound an ordinary pianoforte, while the other serves to record the musical notes simultaneously with their sounding. These two parts of the apparatus are combined in such a manner as to render their action synchronous, by acting on a keyboard corresponding to the keys of a pianoforte.

The sounding apparatus consists of a series of levers and rods transmitting the movement from the keyboard operated by the composer to the keys of a piano in front of which the machine is fixed at the proper distance and height. The recording apparatus is of the type of a suitably modified typewriter.

The invention is illustrated in the accompanying drawing, which is given by way of example only, as obviously the various mechanisms may be modified, provided they are based upon the same general principle of construction and operation in such a manner as to produce the same result without departing from the ambit of the invention.

Figures 1 and 1$^a$ are plan views of two halves of the machine broken at both sides; both the strikers for the piano keys and the whole paper holder having been omitted for the sake of clearness. Fig. 2 is a vertical cross section on the line 2—2, in Fig. 1, showing also the strikers for the piano keys. Fig. 3 is a plan view corresponding to Fig. 2. Fig. 4 is a rear view on an enlarged scale of the mechanism represented in Fig. 2. Fig. 5 is a vertical cross section on the line 5—5 in Fig. 1. Fig. 6 is an elevation of the left hand side of the paper carrier. Fig. 7 is a rear elevation of the same provided with a handle for moving the paper. Fig. 8 is a longitudinal vertical section of the same on the line 8—8 in Fig. 7. Fig. 9 is an elevation of the right side of the complete machine, which includes a pedal mechanism for feeding the recording paper, and Fig. 10 is a detail showing the special ruling of the paper.

The machine embodying the present invention is supported on a table 1 of suitable height, on which is mounted an appropriate base 2 presenting the form of a rectangular frame reinforced by cross members. The keyboard 3, is exactly like that of a piano and is actuated by the composer instead of the keyboard 4, (Figs. 2 and 3) of the piano in front of which the table 1 is arranged at the proper distance in such a manner that the strikers 5 of the machine, like those of a "pianola," correspond exactly with, and rest lightly upon the keys of the piano.

Each key 3 is pivoted on the frame 2 and if necessary is provided with ·a suitable counterweight indicated simply by an arrow 6 for the sake of clearness. Each key rests lightly on a corresponding button 7 similar to a key of a typewriting machine. By means of their stems 8 the buttons 7 are pivoted to arms 9 angularly displaceable, by means of sleeves 10, on a shaft 11 mounted in the frame 2; the successive sleeves 10 being spaced and rendered independent by suitable collars 12. The lower ends of the stems 8 are pivotally connected to levers 13 carried by plates 14 which are rotatably mounted, by means of sleeves formed on their upper ends, on a shaft 15 below the shaft 11; the successive plates 14 being spaced and rendered independent by suitable collars 16. The lower ends of the plates 14 are likewise formed with sleeves and are provided with two suitable recesses, (Fig. 4) through which co-axial pins 17, 18 mounted in the sleeves project. The pins may either be separate or formed in a single piece in order to facilitate the construction and fitting. Each pin 17 carries a rod 19 (Figs. 2 and 3) which is arranged transversely of the machine and jointed at its other end, at the rear of the machine, to the vertical arm of a bell crank lever 20, which is displaceably supported in a bracket 21 fixed to the rear part of the frame 2. The horizontal arm of said lever carries a striker 5 adapted to engage a piano key 4. If desired, the two arms of the bell crank lever 20 instead of being rigidly united in a single piece, may be pivoted together with slight play and provided, if necessary, with a small spring with the object of avoiding the slight slip of the hammer upon the key of the piano. This method of fixing is not shown as it is almost superfluous in view of the small amount of slip and the soft nature of the striker which cannot injure the surface of the key, so that it is perhaps better dispensed with in order to simplify the construction. The other pin 18 of each of the plates 14 of the keys 3 operated by the musician, carries a rod 22 (Figs. 1 and 5,) which runs obliquely toward the center of the machine, where it is connected by means of a bell crank lever 23, rod 24, plate 25, joints 26, 27 and 28, and spring 29 to a character or type 30. This mechanism need not be more particularly described being well known as an essential and common part of every typewriter machine provided with fixed inking pad and does not form *per se* a part of the present invention. It should be noted that in case of limited space and in order to avoid any risk of confusion between the rods 22 of the white keys, and the levers 23 of the black keys, the rods 24 of the rear characters of the white keys may be made of greater length; this lowers the rods 22 of the said white keys, disengaging said rods 22 from the front mechanism of the characters of the black keys. The special arrangement given to the characters should however, be noted as an essential part of the present invention, this arrangement being such that when the characters are inoperative they are pressed by the springs 29 against the inking device 31 and they do not all, when operated, strike the paper at a central point, like the characters of a typewriting machine, but at various points in accordance wth the requrements of the present machine.

It is well known that every musical motive consists of two parts; one the air and the other the accompaniment; the first of which is sounded on the piano usually with the right hand and the second with the left hand, the former being written on a sheet of music on the upper staff and the other on the lower staff. It follows that the left hand series of keys 3 should cause their characters to strike upon the lower staff while those of the right hand series strike on the upper staff. For convenience in construction in this machine, the paper runs in the line of impression from the back to the front of the machine as will hereinafter be described and not in the lateral direction as in each printing line in the ordinary typewriting machine. The two staves are arranged upon the paper relatively to the machine in the following manner, the staff which will be the lower one in reading is situated on the left hand side and the upper staff on the right hand side with the usual interval between them. This result is obtained by arranging each of the printing mechanisms 25, 26, 27, 28, 29 for each of the characters 30 in a different plane. These planes do not all converge to a common center, but cause the characters to strike against the paper at different points on a line transverse to the machine. This result is obtained by the arrangement of the planes of the printing mechanism in a frame 32, in which their supporting pivots are mounted and by means of a guide plate 33 arranged above said frame 32 and fixed thereto by screws, in which plate there are formed two longitudinal openings as a slot 34 for the right hand keys which record the air and a slot 35 for the left hand keys, which record the accompaniment. In addition to the musical notes, however, other signs have to be marked upon the sheet, namely the tempo and the expression. The first is generally indicated by numerals at the beginning of each staff and the second by suitable indications such as "Andante," "Vivace," "Lento," etc., written above the staff. In the present machine the space existing between the two staves is utilized for working these indications and buttons 36 are provided, six in number in the present case, and arranged between the keyboard 3 and the printing frame, and in proximity to the latter, as in a typewriting machine. These buttons are marked to correspond with the impressions that their characters make, and in the example illustrated these indications are as follows reading from left to right: V (veloce) T (tempo norwale) L (lento)

and 2, 3, 4. Every musician will at once understand the use that should be made of these characters for working upon the paper, the tempo and expression of the piece that he is composing. By means of a printing mechanism identical with that for the keys 3, these buttons will operate their respective characters. However, as there is no necessity for displacing these characters such as there is as regards the musical notes and in order to economize space upon the paper between the staves, all these characters are caused to strike the paper at the center of the printing frame where an opening 37 is formed in the guide plate 33 in alinement with and at a suitable interval from the slots 34, 35.

In order to write music clearly with this machine, it is also necessary to provide for distinguishing the sharps and flats, printed by striking the black keys, from the other notes printed by striking the white keys. In this connection it should be noted that the sharps and flats practically correspond so that upon the piano a C sharp is equivalent to a D flat and a D sharp to an E flat and so forth. In order to avoid an excessive number of keys, it will be sufficient for the purposes of the present machine if the types of the black keys rest upon an inking device of a color clearly distinguishable from the color of the ink for the types of the white keys; this will render perfectly plain the nature, whether sharp or flat, of the notes without any necessity for resorting to the well known method of distinguishing them ordinarily employed in writing music. In the present machine this result is attained by arranging all the types of the black keys in the front line, and the types of the white keys in the rear line of the printing frame 32.

It would, in the present machine be impracticable if not impossible to provide the six special signs ordinarily used for every note and even if it were possible, this would render the operation of the keyboard so complicated as compared with the ordinary operation upon the keyboard of a piano as to render such a system unacceptable. This is not necessary in the present machine as the duration of every note corresponds exactly to the length of the impression of the corresponding character upon the continuously moving paper, that is to say the duration of the note is precisely indicated by the length of its impression recorded on the paper. It is only necessary in order to distinguish and clearly read this duration upon the paper, to divide the staves by means of equidistant perpendicular lines (each space corresponding to a tempo unit) and each tempo unit into four equal parts; obviously the fractions of a tempo unit for which a note lasts, will be indicated by the number of spaces occupied by its impression. Accordingly the paper should be fed at a uniform speed and run through a given constant linear space for every musical tempo. This result is attained in the following manner:—A roller 41 for supplying the paper as 42 is rotatably mounted on a paper carrier 38 formed of two parallel plates connected by rods and bolted at 39 to a bracket 40 projecting rearwardly from the printing frame 32. This paper is of the proper width and carries the two longitudinally ruled staves which are divided perpendicularly as stated above. The paper passes between a tension roller 43 and a supporting roller 44, then beneath a platen or printing roller 45, similar to that of typewriting machines, and finally between two gripping and guiding rollers 46, 47 which are rotated by a crank 48, on the axle of the roller 47, to give the paper its initial tension after which the crank is then removed. The paper returns to the rear of the machine and is finally collected in a suitable basket, not shown. By means of a pedal 49, (Fig. 9) which may be provided with a counterweight 50 or with a counter spring (not shown) and by the intermediary of a rod 51, stud plate 52, and pinion 53 integral therewith and a toothed wheel 54 which engages said pinion and is integral with the roller 47, the musician imparts movement to the paper. Each operation of lifting the foot and each depression of it corresponds to a tempo unit and consequently for each of these movements four of the small spaces marked transversely on the staves should pass through the machine. Having regard to the ordinary movement that can be given normally to a pedal and the proportions of the parts of the mechanism the space corresponding to a tempo unit will be about 24 mm. and the height assigned to each staff is about 20 mm. with a somewhat larger space, say 23 mm. between them. Such dimensions render the writing of the present machine perfectly clear.

In order to notify the musician of the uniformity of the tempo unit and as to the uniform unwinding of the paper, there is arranged upon the paper carrier 38, preferably on the side opposite that on which the gear for transmitting movement from the pedal is mounted, a time marking mechanism which comprises a wheel 55 provided with eight teeth and mounted on the same shaft as the roller 47, a toothed wheel 54, a lever 56 with pawl 57 maintained in engagement with the wheel 55 by the greater weight of the lever arm 56, the free end of which each time a tooth of the wheel 55 acts upon the arm or pawl 57 strikes a light blow upon a bell 58. The transmission ratio is such that the bell is struck at each tempo unit. As however these repeated strokes on the bell although small, might disturb the musician, the entire device may be omitted or at least it may be rendered inoperative merely by removing the lever 56 from the paper carrier.

Claims:

1. A piano player and recorder, comprising a plurality of strikers adapted to engage the keys of a piano, a recording member for each striker, and means to operate a striker and recording member simultaneously.

2. A piano player and recorder, comprising a plurality of strikers adapted to engage the keys of a piano, a recording member for each striker, a plurality of operating keys, and means connecting each of the latter with a striker and a recording member.

3. A piano player and recorder, comprising a platen, a plurality of recording elements adapted to engage the latter at different points, keys for operating the recording elements, and a plurality of strikers adapted to engage the keys of a piano and operable by said operating keys simultaneously with the recording elements.

4. A piano player and recorder, comprising a plurality of strikers adapted to depress the keys of a piano, a keyboard operatively connected with the strikers, a rotatable non-traveling platen and a plurality of recording elements operatively connected with the keyboard and strikers and adapted to engage the platen at different points thereof.

5. In a machine for playing a keyboard musical instrument, a plurality of strikers adapted to engage the keys of said instrument, a keyboard, members connecting the keyboard and strikers, a rotatable non-traveling platen, recording elements adapted to engage the latter at different points, and members connecting the recording elements with said keyboard whereby a striker and a recording element are operated simultaneously.

6. In a piano player and recorder, a plurality of strikers adapted to engage the piano keys, a keyboard comprising keys corresponding to the piano keys, rods connecting the strikers and keyboard, a rotatable non-traveling platen, a plurality of recording members, adapted to engage the platen at different points, rods connecting the recording members and keyboard whereby a striker and a recording member are operated simultaneously, and a plurality of recording members operable independently of the strikers.

7. In a piano player and recorder, a plurality of strikers adapted to engage the piano keys, a keyboard comprising keys corresponding to the piano keys, rods connecting the strikers and keyboard, a rotatable non-traveling platen, a plurality of recording members adapted to engage the platen at different points, rods connecting the recording members and keyboard whereby a striker and recording member are operated simultaneously, and a pedal operated mechanism for feeding a paper strip between the platen and recording members at a uniform speed.

8. In a piano player and recorder, a base, a plurality of strikers pivotally mounted thereon and projecting therefrom adapted to engage the keys of a piano, operating keys mounted in front of the strikers, plates pivotally mounted beneath the operating keys, means operated by the latter to swing said plates, a rotatable non-slidable platen, type-bars adapted to engage the platen at different points, and means connecting each of said plates with a type bar and with a striker.

9. In a piano player and recorder, a base, a plurality of strikers pivotally mounted thereon and projecting therefrom adapted to engage the keys of a piano, operating keys mounted in front of the strikers, plates pivotally mounted beneath the operating keys, means operated by the latter to swing said plates, a rotatable non-slidable platen, type-bars adapted to engage the platen at different points, means connecting each of said plates with a type-bar and with a striker, and a series of keys between the platen and operating keys, each connected with a type-bar.

In testimony that I claim the foregoing as my invention, I have signed my name in presence of two subscribing witnesses.

GIOVANNI BATTISTA CIRIGLIANO.

Witnesses:
 PIERO GIANOLIO,
 EUGENIE SURLONE.

Copies of this patent may be obtained for five cents each, by addressing the "Commissioner of Patents, Washington, D. C."